United States Patent Office 3,068,078
Patented Dec. 11, 1962

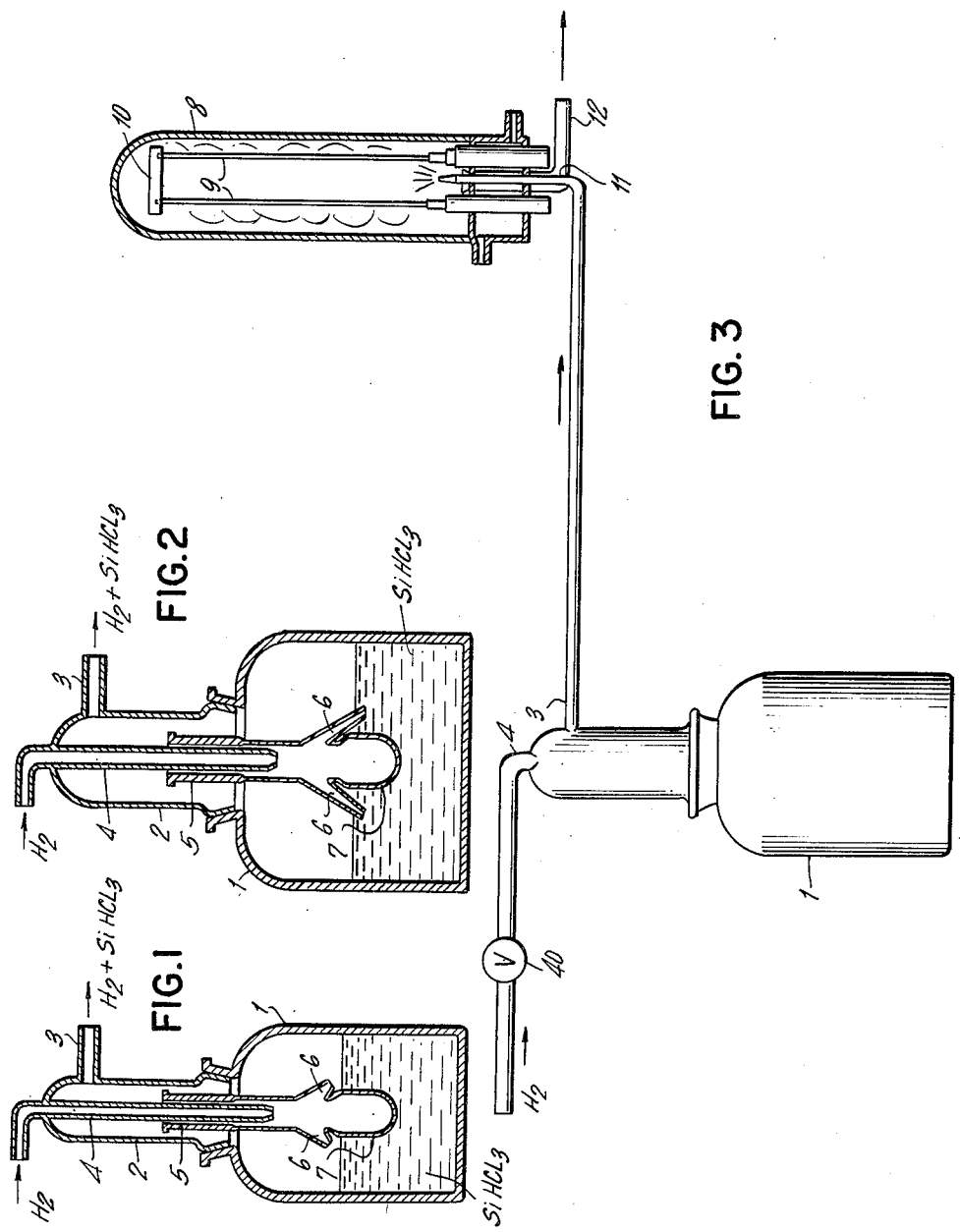

3,068,078
APPARATUS FOR PRODUCING HYPERPURE SILICON FOR ELECTRONIC PURPOSES
Arno Kersting, Pretzfeld, Upper Franconia, Germany, assignor to Siemens-Schuckertwerke Aktiengesellschaft, Berlin-Siemensstadt, Germany, a corporation of Germany
Filed Nov. 18, 1959, Ser. No. 853,885
Claims priority, application Germany Nov. 26, 1958
2 Claims. (Cl. 23—284)

My invention relates to apparatus for producing extremely pure silicon for electronic purposes by reduction and precipitation from a gaseous silicon compound with the aid of a carrier gas acting as a reduction agent which becomes laden with the initially liquid silicon compound when passing through an evaporator vessel in which the liquid is located.

According to one form of my invention the gas inlet duct through which the carrier gas is introduced into the evaporator vessel is movable and is provided with float means which automatically operates to maintain a substantially constant vertical spacing between the inlet opening for the carrier gas and the liquid level of the silicon compound.

A prerequisite for maintaining a constant working pressure of the mixture composed of carrier gas and reaction gas, for example elemental hydrogen $H_2$ and silicochloroform $SiHCl_3$, is the maintenance of a constant flow of the carrier gas and a uniform evaporation of the reaction liquid. For adjusting the necessary working pressure the multi-stage pressure reducers are employed. This permits keeping a practically invariable value of the working pressure and thus of the hydrogen throughput quantity during the processing, once the throughput quantity is properly adjusted.

With the aid of the constant flow of hydrogen thus supplied into the reaction vessel, the reaction liquid, for example, silicochloroform $SiHCl_3$ is evaporated. The evaporating device consists of a flask partially filled with the liquid silicon compound to be evaporated and provided with an inlet duct for the hydrogen acting as a carrier gas, and with an outlet opening for the resulting gaseous mixture. Known devices of this type have the disadvantage that the mole ratio of the gas mixture changes with descending liquid level.

It is an object of my invention to eliminate this disadvantage.

The design of the evaporating device according to the invention is exemplified by the embodiments illustrated in FIGS. 1 and 2 by vertical cross sections respectively. FIG. 3 is a flow diagram of the over-all process.

According to both illustrations, of FIG. 1 and FIG. 2, a cylindrical flat, bottom flask 1 consisting of a material resistant to the silicon compound being used, for example glass, suitable metal, or a mechanically resistant synthetic plastic, is charged with a quantity of silicochloroform to be evaporated. The cylindrical jacket 2 has a conical bottom portion sealingly engageable with the conical neck of the flask 1 and thus also forms a gas-tight seal. The jacket 2 is provided with a lateral duct 3 which forms an outlet for the evolving gas mixture. Fused together with the jacket 2 is an inlet pipe 4 for the supply of the carrier gas such as hydrogen through a pressure reducer and regulator 40 (FIG. 3). Slidably fitting on the lower portion of the pipe 4 is an upwardly extending neck portion 5 of a float 7, so that the float can move downwardly as the level of the liquid compound in the flask drops.

Joined with the float neck 5 above the float 7 proper are two nozzle structures 6 whose nozzle openings are directed toward the liquid level. The nozzle axes are inclined with respect to the vertical axis of the flask in such manner that the gas jet, of the hydrogen, issuing from the nozzles is given a direction toward the liquid surface. The carrier gas, flowing along the surface of the liquid level continuously entrains the chloroform vapor formed at that location, thus accelerating the evaporation. The quantity of the evaporating liquid is predominantly dependent upon the pressure, direction and quantity of the impinging carrier gas. These magnitudes vary with the shape of the nozzles and the spacing of the nozzle opening from the liquid level. The shape of the nozzles is usually determined in the manufacture of the device and in general can subsequently no longer be changed to an appreciable extent. The float structure consists preferably of glass or glass-like synthetic plastic. Due to inevitable manufacturing tolerances or inaccuracies, the quantity of carrier gas required for evaporating a given reaction liquid is determined by tests and is preferably recorded in a calibrating curve for each float device.

FIG. 2 shows a design of the float device in which the nozzle tubes 6' have their nozzle openings located beneath the liquid level. In all other respects the device of FIG. 2 is similar to that described above with reference to FIG. 1.

When using relatively high carrier-gas pressures, it is advisable to use more than two nozzles which are preferably symmetrically distributed about the periphery of the float in order to prevent edging of the float neck on the tube 4 by the back pressure of the gas issuing from the nozzles.

When using a device according to the invention, a given molar mixture ratio of silicochloroform and hydrogen, determined for example by testing as being the most favorable ratio, can be adjusted and can then be automatically kept constant during the precipitation process for which the silicon-containing gas mixture issuing from the apparatus is being used. The hydrogen quantity required for such an advantageous mole ratio can be read off from the calibrating curve for each float device.

The silicon-containing gas mixture issuing from the above-described apparatus is supplied to an apparatus 8 for precipitating the silicon from the gaseous phase onto a heated carrier rod consisting of silicon with the effect of causing the diameter of the silicon rod to grow in accordance with the quantity of silicon precipitated. Such devices are illustrated and described for example in the copending applications of H. Schweikert et al. Serial No. 736,387, filed May 19, 1958, now Patent No. 3,030,189, and Serial No. 665,086, filed June 11, 1957, now Patent No. 3,011,877, assigned to the assignee of the present invention. The hydrogen, silicon hydrogen trichloride mixture is introduced into reactor 8 through nozzle 11, from the opening of which it issues at high velocity, to cause turbulence in the reactor. The silicon rods 9 are heated by passage of electric current therethrough to incandescence or other temperature sufficient to cause decomposition and/or reduction of the silicon hydrogen trichloride. The reaction gases are removed through pipe 12.

I claim:
1. An apparatus system for producing hyperpure silicon for electronic purposes by reduction and precipitation from a gaseous silicon compound with the aid of a carrier gas acting as a reducing agent, comprising an enclosed evaporator vessel having a lower vessel portion for containing a quantity of liquid silicon compound to be evaporated and having an upper vessel portion sealingly engaged with said lower vessel portion, said upper vessel portion having an inlet duct for said carrier gas and an outlet duct for the gaseous mixture produced, means for supplying said carrier gas to said inlet duct at a regulatable pressure, said inlet duct having a movable end portion extending into said lower vessel portion, float means directly below and axially aligned with said end portion to move said end portion along said inlet duct in response to changes in liquid level, said float means having a floatable lower portion and a non-floatable upper portion, said upper portion being attached to said end portion, a plurality of peripherally distributed tapered nozzles on said end portion and located above said float means, said tapered nozzles being directed downwardly and outwardly in relation to said float means, a reactor containing a silicon carrier body upon which said precipitation takes place, and conduit means connecting said outlet duct with said reactor.

2. An apparatus system for producing hyperpure silicon for electronic purposes by reduction and precipitation from a gaseous silicon compound with the aid of a carrier gas acting as a reducing agent, comprising an enclosed evaporator vessel having a lower vessel portion for containing a quantity of liquid silicon compound to be evaporated and having an upper vessel portion, said upper vessel portion having an inlet duct for said carrier gas and an outlet duct for the gaseous mixture produced, means for supplying said carrier gas to said inlet duct at a regulatable pressure, said inlet duct having a movable end portion extending into said lower vessel portion, float means directly below and axially aligned with said end portion to move said end portion along said inlet duct in response to changes in liquid level, said float means having a floatable lower portion and a non-floatable upper portion, said upper portion being attached to said end portion, a plurality of peripherally distributed tapered nozzles on said end portion and located above said float means, said tapered nozzles being directed downwardly and outwardly in relation to said float means, said nozzles ending above said floatable lower portion of said float means, a reactor containing a silicon carrier body upon which said precipitation takes place, and conduit means connecting said outlet duct with said reactor.

References Cited in the file of this patent

UNITED STATES PATENTS 355,594     Daimler _____ Jan. 4, 1887

OTHER REFERENCES

Purification of Silicon, Theuerer, Bell Laboratories Record, vol. 33, 1955, pp. 327–330.